United States Patent [19]

Thomas

[11] Patent Number: 4,463,362

[45] Date of Patent: Jul. 31, 1984

[54] INK CONTROL BAFFLE PLATES FOR INK JET PRINTER

[75] Inventor: Jacob E. Thomas, Ithaca, N.Y.

[73] Assignee: NCR Corporation, Dayton, Ohio

[21] Appl. No.: 385,967

[22] Filed: Jun. 7, 1982

[51] Int. Cl.[3] .............................................. G01D 15/18

[52] U.S. Cl. .................................... 346/140 R; 346/75

[58] Field of Search ............... 346/140 R, 140 PD, 75

[56] References Cited

U.S. PATENT DOCUMENTS 3,771,165 11/1973 Kurimoto et al. .............. 346/140 R 4,385,304 5/1983 Sniderman ................... 346/140 PD 4,394,669 7/1983 Ozawa et al. ................ 346/140 PD

*Primary Examiner*—George H. Miller, Jr.

*Attorney, Agent, or Firm*—J. T. Cavender; Wilbert Hawk, Jr.; George J. Muckenthaler

[57] ABSTRACT

A movable ink reservoir carries a plurality of ink jet print heads and supplies ink to the heads by means of separate conduits. The reservoir includes baffle means therein formed to provide individual ink tanks for the print heads and to prevent or substantially minimize the sloshing motion of the ink as the reservoir is accelerated and decelerated in printing operation.

15 Claims, 2 Drawing Figures

INK CONTROL BAFFLE PLATES FOR INK JET PRINTER

CROSS-REFERENCE TO RELATED APPLICATIONS

Ink Evaporation Prevention Means For Ink Jet Printer, U.S. Pat. No. 4,412,233, issued to J. E. Thomas and J. K. McKnight on Oct. 25, 1983.

Ink Level Control For Ink Jet Printer, copending application Ser. No. 385,965, filed June 7, 1982, invented by Jacob E. Thomas, and assigned to NCR Corporation.

Ink Level Control For Ink Jet Printer, copending application Ser. No. 385,955, filed June 7, 1982, invented by Richard G. Bangs and Jacob E. Thomas, and assigned to NCR Corporation.

Ink Control for Ink Jet Printer, U.S. Pat. No. 4,418,353, issued to J. E. Thomas on Nov. 29, 1983.

BACKGROUND OF THE INVENTION

In the field of non-impact printing, the most common types of printers have been the thermal printer and the ink jet printer. When the performance of a non-impact printer is compared with that of an impact printer, one of the problems in the non-impact machine has been the control of the printing operation. As is well-known, the impact operation depends upon the movement of impact members, such as print hammers or wires or the like, which are typically moved by means of an electromechanical system and which may, in certain applications, enable a more precise control of the impact members.

The advent of non-impact printing, as in the case of thermal printing, brought out the fact that the heating cycle must be controlled in a manner to obtain maximum repeated operations. Likewise, the control of ink jet printing, in at least one form thereof, must deal with rapid starting and stopping movement of the ink fluid from a supply of the fluid. In each case of non-impact printing, the precise control of the thermal elements and of the ink droplets is necessary to provide for both correct and high speed printing.

In the matter of ink jet printing, it is extremely important that control of the ink droplets be both precise and accurate from the time of formation of the droplets to depositing of such droplets on paper or like record media and to make certain that a clean printed character results from the ink droplets. While the method of printing with ink droplets may be performed in either a continuous manner or in a demand pulse manner, the latter type method and operation is disclosed and is preferred in the present application when applying the features of the present invention. The drive means for the ink droplets is generally in the form of a well-known crystal or piezoelectric type element to provide the high speed operation for ejecting the ink through the nozzle while allowing time between droplets for proper operation. The ink nozzle construction must be of a nature to permit fast and clean ejection of ink droplets from the print head.

In the ink jet printer, the print head structure may be a multiple-nozzle type, with the nozzles aligned in a vertical line and supported on a print head carriage which is caused to be moved or driven in a horizontal direction for printing in line manner.

Alternatively, the printer structure may include a plurality of equally-spaced, horizontally aligned, single nozzle print heads which are caused to be moved in back-and-forth manner to print successive lines of dots in making up the lines of characters. In this latter arrangement, the drive elements or transducers are individually supported along a line of printing.

In a still different structure, the nozzles are spaced in both horizontal and vertical directions, and the vertical distance between centers of the ink jets equals the desired vertical distance between one dot and the next adjacent dot above or below the one dot on the paper. The horizontal distance is chosen to be as small as mechanically convenient without causing interference between the actuators, reservoirs, and feed tubes associated with the individual jets. The axes of all jets are aligned approximately parallel to each other and approximately perpendicular to the paper. Thus, if all nozzles were simultaneously actuated, a sloped or slanted row of dots would appear on the paper and show the dots spaced both horizontally and vertically. In order to produce a useful result consisting of dots arranged as characters, it is necessary to sweep the ink jet head array back and forth across the paper, and actuate each individual nozzle separately when it is properly located to lay down a dot in the desired position. A vertical row of dots is created by sequentially actuating the nozzles rather than simultaneous actuation, the latter being the preferred practice in the more common nozzle arrangements.

A further observation in ink jet printers is that previous and current designs for drop-on demand ink jet print heads are sensitive to the ingestion of air into or the presence of air in the supply of ink. Even a small air bubble can interrupt or fault the performance of transducers or like devices that expel ink droplets from a nozzle by means of pressure pulses created within an ink-filled chamber or channel.

The use of a fast-acting valve or like device to control the flow of ink to a single ink jet printing nozzle is known in specific applications, but in certain cases the concept and structure has been considered costly and impractical. Additionally, the supply of ink to a plurality of ink jet nozzles may be controlled by means of a single control device wherein the nozzles are connected to a common manifold and ink droplet ejection is accomplished by momentarily increasing the pressure in the manifold.

After the droplets of ink have been ejected from the nozzles, the ink is replenished thereat from a remote supply by the capillary action of the meniscus at the end of the nozzle. In certain control devices and arrangements for ink jet printers, it has been found that some difficulties arise from the capillary action refill or replenish process and there are adverse effects on the performance and reliability of such printers.

In normal operation of an ink jet print head, it is known in the art that a negative meniscus of ink should be maintained at the nozzle, that the relative levels of ink in the various parts or areas of the system have an effect on the printing operation, and further, that the movement of the several printer elements affects the flow of ink during the printing cycle.

An additional observation in the operation of an ink jet printer of the drop-on-demand type is that each time a drop of ink is ejected from the nozzle, a pressure wave or surge originates thereat and travels back toward the reservoir of ink. Such pressure wave then may return toward the nozzle in a reflected manner of action and movement and cause faulty performance in the printing operation. It is of concern in the operation that such pressure waves are controlled in a manner so as not to affect the printing, or at least to minimize, the effect of any such wave motion thereon. It is also important to consider the arrangement of the several parts or elements of a printer when dealing with pressure changes associated with or caused by wave motion in the ink.

Representative documentation in the field of ink control means for ink jet printers includes U.S. Pat. No. 3,683,212, issued to S. I. Zoltan on Aug. 8, 1972, which discloses a well-known ink jet print device wherein an electro-acoustic transducer is coupled to liquid in a conduit which terminates in a small orifice through which droplets of ink are ejected.

U.S. Pat. No. 3,750,564, issued to H. Bettin on Aug. 7, 1973, discloses a multiple nozzle ink jet print head having an ink chamber with opposed electrodes and insulating partitions to define capillary chambers. Ink drops are initiated by electrical forces of attraction and repulsion between the charged writing fluid in a capillary channel and electrodes of opposite polarity mounted on either end of the capillary channel.

U.S. Pat. No. 3,832,579, issued to J. P. Arndt on Aug. 27, 1974, discloses another well-known pulsed droplet ejecting system wherein an electro-acoustic transducer applies a pressure pulse to the liquid in a reflection-free section of the transducer and sends a pressure wave to the nozzle to cause ejection of an ink droplet and includes conduit means and resistance material for absorbing energy of return pressure waves.

U.S. Pat. No. 3,983,801, issued to A. Watanabe et al. on Oct. 5, 1976, discloses an ink jet printer having at least one ink mist passage provided at a location closely adjacent the surface of ink solution.

U.S. Pat. No. 4,015,272, issued to K. Yamamori et al. on Mar. 29, 1977, discloses a chamber having an outer portion and an inner portion connected by a channel and wherein the portions are communicated to the atmosphere by vent passageways to withdraw air when the writing unit is first located with liquid and to prevent introduction of bubbles into the liquid during operation.

U.S. Pat. No. 4,126,868, issued to W. Kirner on Nov. 21, 1978, discloses a printer unit in which individual printing jets are connected through a distributor arrangement and supplied from an ink reservoir. An air venting or bleed passageway connects the ink reservoir and the atmosphere and has a diameter sufficiently small to produce a capillary effect.

U.S. Pat. No. 4,152,710, issued to M. Matsuba et al. on May 1, 1979, discloses an ink cartridge and a reservoir along with an electromagnetic cross valve for selectively connecting a nozzle with an ink liquid supply conduit from the reservoir or with an ink liquid drain conduit from a by-pass tank. When the valve is connected with the drain conduit, the ink liquid is at a height to remain in the nozzle.

U.S. Pat. No. 4,153,902, issued to Y. Kanayama on May 8, 1979, discloses an ink liquid supply system wherein a subtank is interposed between an ink reservoir and a pump in the supply line. A valve and a pair of filters are also provided in the line.

And, U.S. Pat. No. 4,178,595, issued to K. Jinnai on Dec. 11, 1979, discloses a first ink tank attached to a movable ink jet print head and a second ink tank fixedly mounted at an end of a carriage which supports the print head. Means is provided for sensing the amount of ink in the first tank at certain levels and indicating the amount of ink in the second tank.

SUMMARY OF THE INVENTION

The present invention relates to ink jet printers, and more particularly, to means for controlling the ink fluid between an ink supply tank and a second tank carrying a plurality of ink jet nozzles. The ink supply system provides a main reservoir which is stationary and vented to the atmosphere, and a local reservoir which is likewise vented and carried on a carriage and movable in back-and-forth manner along a print line relative to paper or like record media. The local reservoir has at least a pair of print heads supported from and carried therewith in reciprocating manner during the printing operation.

A preferred arrangement of the present invention may be utilized wherein a plurality of ink jet nozzles are served from one reservoir and the structure thereof prevents, or at least substantially reduces, excessive changes in pressure resulting from the movement of the local reservoir. The several ink jet nozzles or print heads are closely spaced and generally aligned in a horizontal direction for printing rows of dots by ejection of ink droplets on the paper or like record media.

Each of the nozzles is associated with a respective ink supply tank or chamber by reason of separation or partition means in the form of baffle plates within the local reservoir, spaced from each other, and located at precise positions to control the ink level for each respective nozzle. An aperture is provided in each baffle near the lower end or portion thereof to allow limited flow of ink between adjacent chambers or compartments for the purpose of equalizing the ink level. The baffle plates are formed as an integral part of the local reservoir, connected with and extending between the front and rear walls and, in effect, provide a chamber or tank for each nozzle.

In view of the above discussion, the principal object of the present invention is to provide means permitting controlled amounts of ink to flow into separate reservoir chambers in an arrangement wherein the ink is used for marking or printing on record media.

Another object of the present invention is to provide means for controlling movement of ink from a supply thereof to each individual ink jet nozzle.

An additional object of the present invention is to provide means for controlling movement of ink in a reciprocating reservoir carrying a plurality of ink jet print heads.

A further object of the present invention is to provide a reciprocating reservoir having baffle means therein for maintaining the ink at predetermined levels during printing operation.

Another object of the present invention is to provide a reciprocating reservoir for supplying a plurality of ink jet nozzles and having separate chambers for the nozzles with means for controlling excessive movement or permitting controlled flow of ink between adjacent chambers.

Additional advantages and features of the present invention will become apparent and fully understood from a reading of the following description taken together with the annexed drawing.

DESCRIPTION OF THE PREFERRED EMBODIMENT

Figure 1:
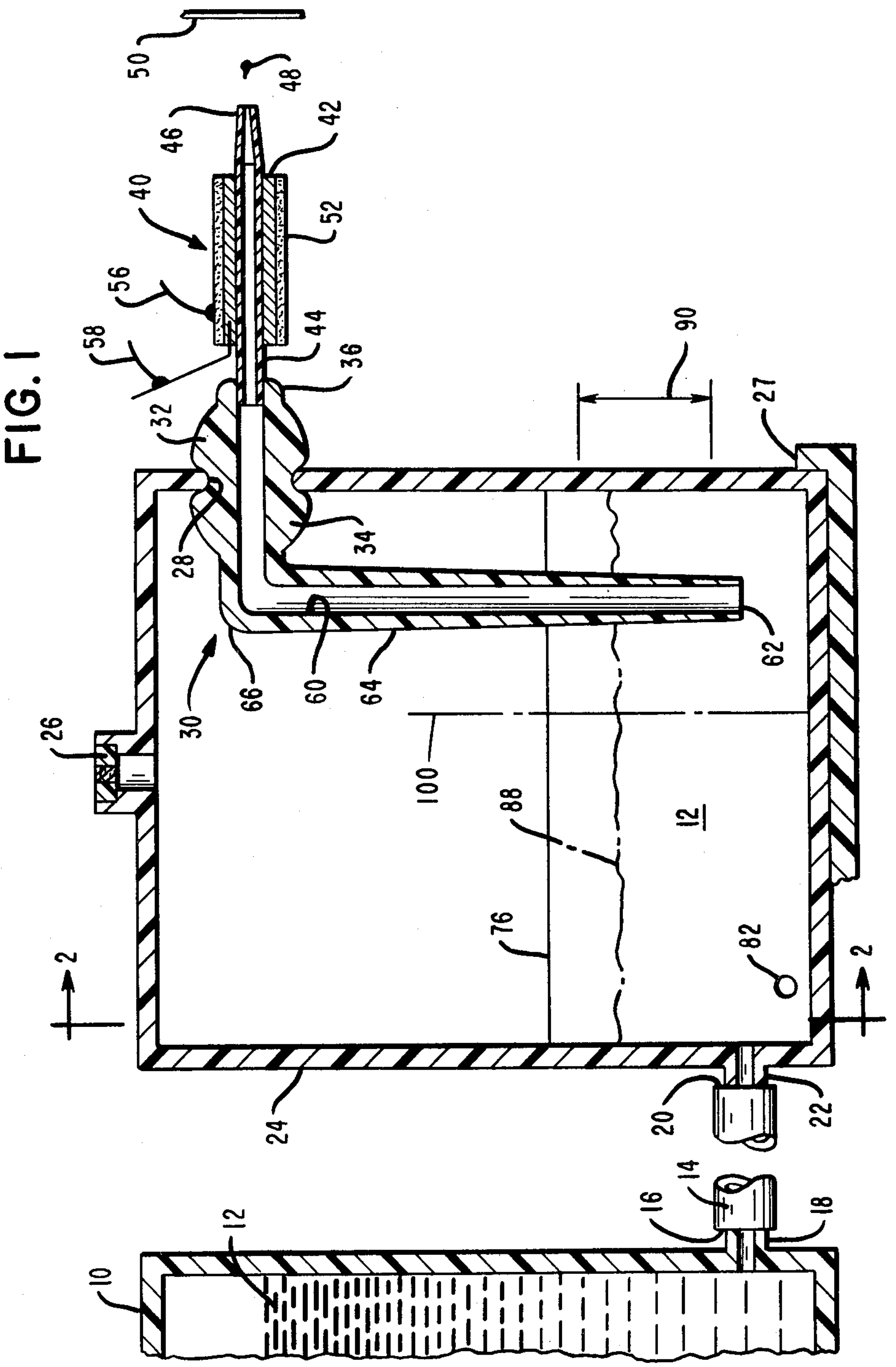
FIG. 1 is a diagrammatic view, partly in section, of a printing system incorporating the subject matter of the present invention and taken along the line 1—1 of FIG. 2.

Referring now to the drawing, FIG. 1 shows a portion of a main or primary reservoir 10 which contains a supply of printing ink 12 sufficient for printing in excess of several million characters. A length of flexible tubing 14 is connected at one end 16 to an outlet 18 of the reservoir 10 and the tubing is connected at the other end 20 to an inlet 22 of a secondary reservoir 24. The tubing 14, shown broken in form, may include a constriction device for limiting the volume of ink flowing between the reservoirs 10 and 24 and thereby prevent pressure surges in the ink within the reservoir 24 upon rapid movement thereof during printing operations. The reservoir 24 has a filter-type vent 26 suitably disposed in the top for access to the atmosphere in the manner of allowing equalizing of pressure between the reservoir and the atmosphere over an extended period of time, to prevent entry of dust or foreign particles into the reservoir, and to reduce evaporation of any water or like constituent of the ink from the reservoir. A suitable reservoir carrier 27 is provided to move the reservoir 24 in rapid back and forth reciprocating manner, in the direction as viewed by the observer, during printing operation.

The local or movable reservoir 24 also includes an opening 28 in one side wall thereof for receiving a molded elastomer member 30 which is formed to include an enlarged portion 32 on the outer side of the reservoir wall and a similar enlarged portion 34 on the inner side of the reservoir wall and wherein such enlarged portions provide a fluid-tight connection with the wall of the reservoir. The elastomer member 30 is in the form of a conduit or tube which terminates with one end 36 outside the reservoir 24 and which end is connected with an ink jet print head 40. The reservoir 24 carries two or more of the print heads 40 and the close proximity of such heads minimizes the tendency to eject ink unintentionally or to ingest air into the heads when such print heads are caused to be moved in rapid acceleration and deceleration manner by the carrier 27 during printing operation.

The print head 40 includes a body portion 42 of cylindrical form having a glass tube or glass-lined passageway 44 through the body portion and terminating in a nozzle 46 for ejecting a droplet 48 of printing ink to be applied to record media 50, which media may be in the form of paper or the like, and supported in suitable manner around a drum or from a platen (not shown).

The print head 40 may be of a type as disclosed in Arndt U.S. Pat. No. 3,832,579, appropriate for and commonly used in ink jet printing operations, and which includes a piezoelectric device or tubular type transducer 52 for causing ejection of the ink droplets 48, either in synchronous or asynchronous manner, from the print head nozzle 46. The ink droplets 48, so produced from the nozzle 46, are essentially the same or constant in size and are normally ejected at a constant velocity. Leads 56 and 58 are appropriately connected to the print head 40 for actuating the transducer 52 to cause ejection of the ink droplets 48 in well-known manner.

The elastomer member 30, in the form of an L-shaped ink supply tube, is formed with an inside opening 60 which is substantially constant throughout the length of the tube and running from the outer end 36 connected to the print head 40 and extending to a downturned opposite end 62 which is immersed in the printing ink 12 within the reservoir 24. Starting at a point upstream from the enlarged portion 34 of the member 30, the wall thickness thereof gradually decreases and results in a decreasing outside diameter portion 64 down to the end 62. The decreasing wall thickness provides a flexible and pliant portion of the tube generally beyond the bend 66 thereof, which portion 64 allows the pressure waves returning from the nozzle 46, after actuation of the print head 40 in ejecting an ink droplet 48, to expend energy in stretching or flexing the tube radially outwardly along the wall portion 64 above the reduced diameter inlet end 62. Since there is at least minimal or no great change in the dimensions of the tube 30 over a distance along the length thereof comparable to the wave lengths of sound associated with pressure waves, such pressure waves are absorbed by the flexible and pliant portion 64 of the tube, rather than being reflected back in the direction toward the nozzle 46. The elastomer member or tube 30 utilized in the reservoir 24 may be made of Tygon (a polyvinyl chloride material manufactured by The Norton Chemical Company). Since the tube 30 is almost totally within the reservoir 24 and in the vaporous ink atmosphere thereof, the ink carried by the tube maintains its composition or constituency for maximum effective printing. Further, it is seen that the tapered wall portion 64 enables the use of a shorter tube for carrying the ink and at the same time absorb the return pressure waves in the ink from the nozzle 46.

Figure 2:
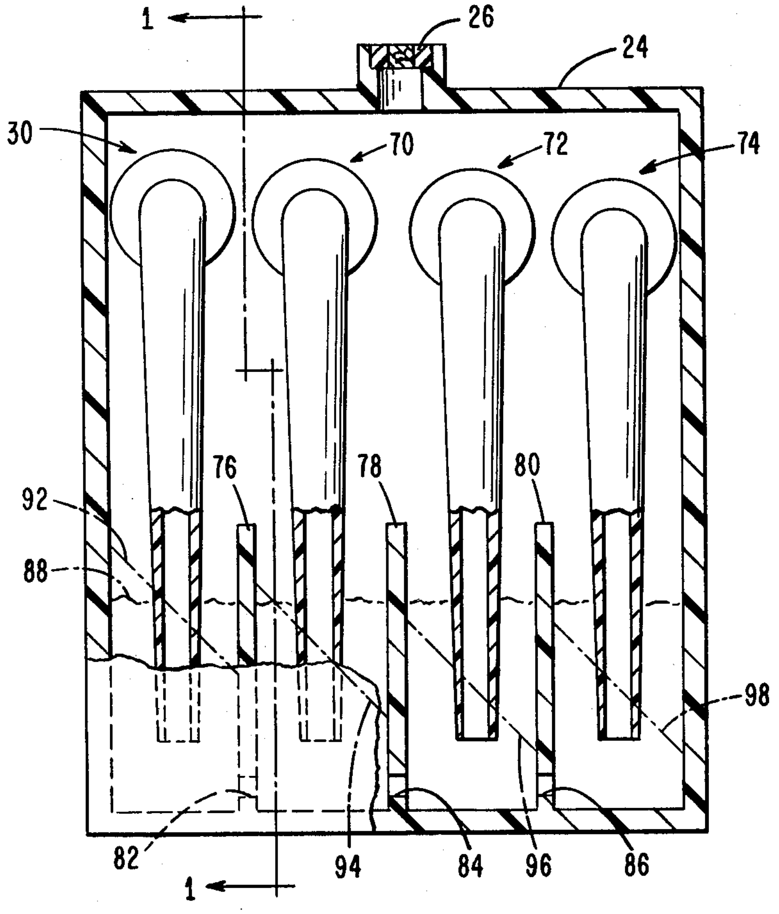
FIG. 2 is a sectional view taken along the line 2—2 of FIG. 1.

FIG. 2 is a rear view taken generally along the line 2—2 of FIG. 1 and shows the elastomer member or ink supply tube 30 along with several additional elastomer members or supply tubes 70, 72 and 74 substantially identical with tube 30 except for the length thereof. As illustrated, while the reduced diameter inlet end of each of such tubes is located at a like distance from the bottom of the reservoir 24, the enlarged upper portion of each of such tubes extends through the side wall of such reservoir 24 at an elevation slightly different from the remaining such tubes. It is thus apparent that the several print heads (not shown) associated with the tubes 70, 72 and 74 are at slightly different heights with respect to print head 40. In this manner, the ink droplets 48 ejected from the respective print heads 40 are at different vertical positions for printing a line of characters as the print heads are moved in the lateral direction by the well-known carrier means 27 (FIG. 1) along a line of printing.

When the reservoir 24 along with the several print heads (one of which is designated 40 in FIG. 1) are moved from side to side (FIG. 2) in the printing operation, the ink 12 within such reservoir is subjected to forces of rapid acceleration and deceleration and the ink is caused to undergo "sloshing" motion in a back-and-forth manner. Means for preventing, or at least substantially minimizing, the excessive sloshing or agitating motion of the ink 12 is accomplished by use of baffles positioned between the ink supply tubes 30, 70, 72 and 74 for the respective print heads 40. The preferred baffles 76, 78 and 80 are in the form of plates extending from the front wall to the rear wall of the reservoir 24 and are formed as an integral part of such reservoir 24 at the floor thereof, as best shown in FIG. 2. Such baffles 76, 78 and 80 are thus formed within the reservoir 24 to provide a separate ink tank or chamber for each of the ink supply tubes 30, 70, 72 and 74 for the print heads 40. A plurality of apertures 82, 84 and 86 are provided in the baffle plates 76, 78 and 80, respectively, near the bottom thereof and located near the rear wall of the reservoir 24 for equalizing the levels of ink 12 in the respective baffle-formed chambers or tanks. While apertures 82, 84 and 86 are shown in the plates 76, 78 and 80, any suitable opening at or near the bottom of the plates could serve the purpose of allowing the ink to flow between the chambers.

The operating ink level for the print heads 40, indicated as 88 in the reservoir 24, is maintained within an allowable range, as indicated by the arrow 90 at the right side of FIG. 1. The difference in the ink level 88 indicated in reservoir 24 and the level of ink 12 in reservoir 10 may be attained by means of a suitable valve or pump located in the flexible line 14 between the reservoirs. It has been found in actual operation that without some type of baffle or damping means or the like in the reservoir 24, the rapid acceleration of reservoir 24 during printer operation would cause the ink 12 to actually leave a void at the lower end of the tube 74, while climbing the wall adjacent the tube 30 almost to the height of the print head 40 thereof. On the other hand, through use of the baffles within the reservoir 24, the locations of the ink surfaces in the respective ink chambers or tanks formed by such plates 76, 78 and 80 have been found to be as indicated by the dotted lines 92, 94, 96 and 98 during such conditions of rapid acceleration of the reservoir 24, for example, to the right in FIG. 2. Such ink locations, it is seen, maintain an ink 12 level above the inlet ends of the supply tubes 30, 70, 72 and 74 throughout the overall operation of the printer.

An additional baffle, perpendicular to the baffles 76, 78 and 80, may also be located within the reservoir 24 at the position indicated by the line 100 in FIG. 1. Such baffle further restricts ink level change at the inlets to the tubes 30, 70, 72 and 74 during any excessive movement of the reservoir 24 in a direction parallel with the print head nozzles 46 as may be caused by accidental jarring or movement of the printer.

It is thus seen that herein shown and described is an ink jet printing system wherein the primary feature of the invention is the maintaining of the ink level within a certain range by means of baffle plates in a movable reservoir accommodating a plurality of print heads. The plates prevent the printing ink from sloshing back and forth an excessive amount upon acceleration and deceleration of the reservoir and ensure that a supply of ink is maintained in the supply tubes to the print heads. The printing system provides for a very small ink reservoir or compartment directly behind each nozzle and closely associated therewith for reducing pressure changes, measured at the nozzle of the print head, which result from the horizontal movement associated with the print carriage during printer operation or which may arise from accidental shaking, jarring or moving the entire printer. The apparatus of the present invention enables the accomplishment of the objects and advantages mentioned above, and while a preferred embodiment has been disclosed herein, variations thereof may occur to those skilled in the art. It is contemplated that all such variations not departing from the spirit and scope of the invention hereof, are to be construed in accordance with the following claims.

I claim:

1. Means for preventing excessive ink movement comprising a reservoir containing a supply of ink at an operating level therein and operably associated with and carrying a plurality of ink jet print heads, conduit means associated with each of the print heads and with the supply of ink for providing ink to the print heads in individual manner, means for causing the reservoir and the print heads to be accelerated and decelerated in rapid motion during printing operation, and baffle means within the reservoir integral therewith and extending upwardly above the operating level of the ink and forming separate chambers for the conduit means and preventing excessive motion of the ink in a lateral direction within the reservoir during printing operation.

2. The subject matter of claim 1 wherein the ink jet print heads are carried by said reservoir and comprise tubular transducers for ejecting droplets of ink.

3. The subject matter of claim 1 wherein the conduit means is connected with a print head and includes a tapered wall portion extending into the ink supply at the inlet end thereof.

4. The subject matter of claim 1 wherein the baffle means comprise at least one plate separating the reservoir into individual chambers for containing the supply of ink to each of the print heads.

5. The subject matter of claim 1 wherein the baffle means comprise a plurality of plates spaced to provide individual chambers for the print heads and each of the plates includes an opening to allow passage of ink therethrough for equalizing ink levels within the chambers.

6. Means for minimizing movement of ink in an ink supply system comprising means containing a supply of ink at an operating level and movable in side-to-side direction, a plurality of print heads utilizing ink in printing operation and carried by the ink containing means, conduit means for carrying ink from the ink containing means to each of the print heads, and baffle means positioned within said ink containing means integral therewith and extending upwardly above the operating level of the ink for providing a separate ink compartment for each of the print heads and inhibiting sloshing of ink in the ink containing means during acceleration and deceleration thereof in printing operation.

7. The subject matter of claim 6 wherein said baffle means comprise at least one upstanding member separating the ink containing means into individual compartments for supply of ink to the respective print heads.

8. The subject matter of claim 7 wherein the conduit means comprises an ink supply tube connected at one end thereof with each of the print heads and extending therefrom into the supply of ink of a respective compartment at the other end thereof.

9. The subject matter of claim 7 wherein said upstanding member includes an opening therethrough to allow passage of ink for equalizing ink levels within the individual compartments.

10. The subject matter of claim 8 wherein the ink containing means is a reservoir and said print heads comprise a plurality of tubular transducers for ejecting droplets of ink.

11. In an ink jet printer, a reservoir containing a supply of ink at an operating level therein, a plurality of tubular ink jet print heads carried by and movable with the reservoir, a plurality of conduit means carrying ink in individual manner from the supply of ink to each of the print heads, and baffle means within said reservoir integral therewith and extending upwardly above the operating level of the ink and forming individual compartments of ink for the respective conduit means and positioned to minimize sloshing of the ink in the reservoir when the print heads are moved in rapid side-to-side motion during printing operation.

12. In the printer of claim 11 wherein the ink jet print heads are piezoelectric transducers for ejecting droplets of ink.

13. In the printer of claim 11 wherein the baffle means comprises at least one plate member separating the reservoir into an individual compartment for each of the print head conduit means.

14. In the printer of claim 11 wherein the baffle means comprise upstanding plate members joining opposed walls of the reservoir and including openings therethrough to allow passage of ink for equalizing ink levels within the individual compartments formed by such plate members.

15. In the printer of claim 11 wherein the baffle means comprise thin wall portions extending upwardly from the floor of the reservoir to form separate ink supply tanks for the print heads and wherein each wall portion includes an aperture positioned near the floor to allow passage of ink slowly therethrough for equalizing ink levels within the tanks.

* * * * *